United States Patent
Pyre

(10) Patent No.: US 9,441,735 B2
(45) Date of Patent: Sep. 13, 2016

(54) LOW-COST HIGH-PERFORMANCE ANNULAR METALLIC SEAL FOR HIGH PRESSURES AND LARGE DIAMETERS

(71) Applicant: SNECMA, Paris (FR)

(72) Inventor: Alain Pyre, Saint Just (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/439,614

(22) PCT Filed: Oct. 21, 2013

(86) PCT No.: PCT/FR2013/052507
§ 371 (c)(1),
(2) Date: Apr. 29, 2015

(87) PCT Pub. No.: WO2014/068218
PCT Pub. Date: May 8, 2014

(65) Prior Publication Data
US 2015/0292623 A1    Oct. 15, 2015

(30) Foreign Application Priority Data
Oct. 31, 2012    (FR) ...................................... 12 60401

(51) Int. Cl.
| | |
|---|---|
| F16J 15/08 | (2006.01) |
| B23K 31/02 | (2006.01) |
| B23K 37/00 | (2006.01) |
| F16L 23/20 | (2006.01) |

(52) U.S. Cl.
CPC ............ *F16J 15/0887* (2013.01); *B23K 31/02* (2013.01); *B23K 37/00* (2013.01); *F16L 23/20* (2013.01)

(58) Field of Classification Search
CPC ............ F16J 15/02; F16J 15/06; F16J 15/08; F16J 15/0887; F16J 15/0893
See application file for complete search history.

(56) References Cited

U.S. PATENT DOCUMENTS

| | | | | | |
|---|---|---|---|---|---|
| 3,204,971 | A | * | 9/1965 | Meriano | F16J 15/0887 277/641 |
| 3,595,588 | A | * | 7/1971 | Rode | F16J 15/0887 277/647 |
| 7,316,402 | B2 | * | 1/2008 | Paauwe | F01D 11/005 277/641 |
| 8,556,578 | B1 | * | 10/2013 | Memmen | F01D 5/189 277/644 |
| 2009/0155671 | A1 | * | 6/2009 | Reytier | C25B 9/18 429/483 |
| 2013/0049301 | A1 | * | 2/2013 | Ryan | F16J 15/0887 277/312 |

FOREIGN PATENT DOCUMENTS

| | | |
|---|---|---|
| EP | 2 071 216 A1 | 6/2009 |
| FR | 2 800 147 A1 | 4/2001 |
| GB | 2 316 720 A | 3/1998 |

OTHER PUBLICATIONS

Search Report mailed on Jan. 21, 2014, in corresponding International Application No. PCT/FR2013/052507, filed on Oct. 21, 2013 (2 pages).

* cited by examiner

*Primary Examiner* — Gilbert Lee
(74) *Attorney, Agent, or Firm* — Bookoff McAndrews, PLLC

(57) ABSTRACT

An annular metal static seal (10) comprising a first annular bearing plate (12A), a facing second annular bearing plate (12B), and an annular central portion (14) perpendicularly connecting together the first and second annular bearing plates and secured in sealed manner to each of them via a respective annular weld, the assembly thus presenting a section in the shape of the letter H on its side.

12 Claims, 2 Drawing Sheets

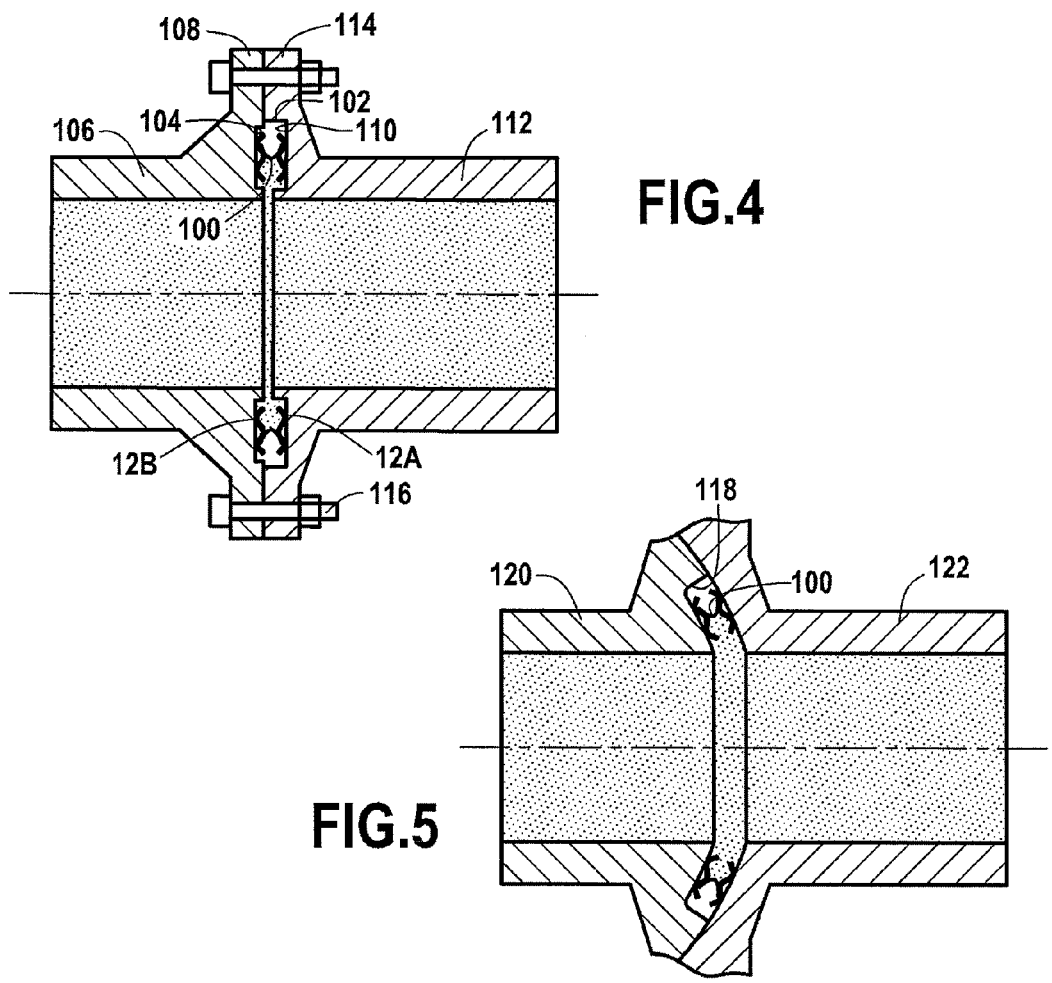
FIG.4
FIG.5
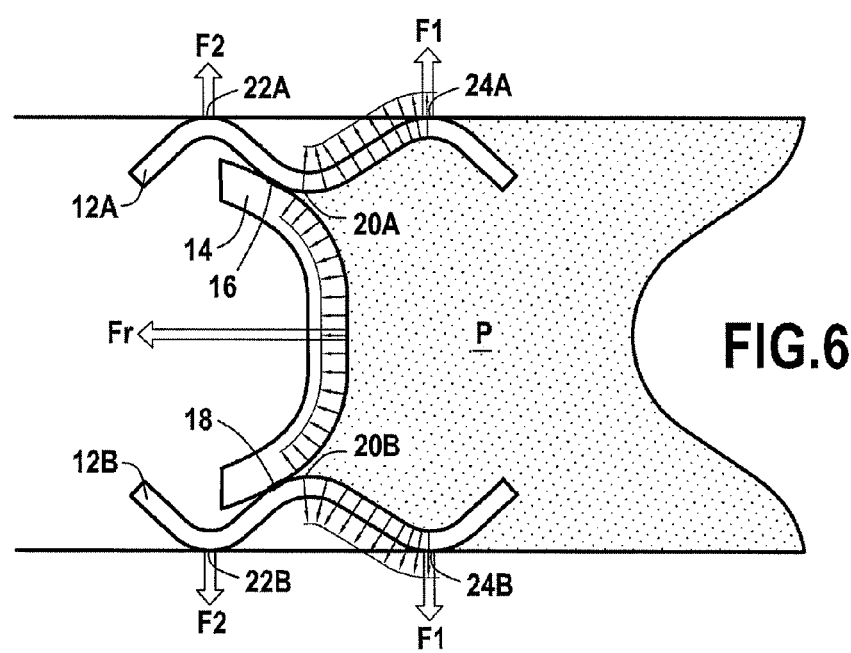
FIG.6

LOW-COST HIGH-PERFORMANCE ANNULAR METALLIC SEAL FOR HIGH PRESSURES AND LARGE DIAMETERS

This application is the U.S. national phase entry under 35 U.S.C. §371 of International Application No. PCT/FR2013/052507, filed on Oct. 21, 2013, which claims priority to French Patent Application No. FR 1260401, filed on Oct. 31, 2012, the entireties of each of which are incorporated by reference herein.

BACKGROUND OF THE INVENTION

The invention relates to a metal static seal of hollow annular type for providing sealing under severe conditions of use, typically at temperatures that are very high or very low, at high pressures, and for large diameters, such as in aviation and space environments.

The seal is said to be "static" because such a seal is used in configurations where there is no moving part in contact therewith. Static sealing is then provided. The drawback of such seals is that they are difficult to fabricate since they are usually made by machining, which is an operation that is found to be lengthy and expensive.

That is why, in application FR 2 800 147, the Applicant has proposed an annular metal static seal that can be made simply by stamping.

Nevertheless, although seals of that type are inexpensive to produce, they do not present a profile of sufficient strength to withstand in combination very high pressures and large diameters in applications that require high performance sealing (such as all the other seals presently used in the production of aeroengines, which tend to suffer excessive plastic deformation, i.e. deformation that has a harmful impact on the performance of the seal, in particular in terms of its usable restitution).

The term "very high" pressure is used to mean pressures of several hundred bar (typically greater than $2 \times 10^7$ Pascals), depending on the dimensions and the substrate material used.

The term "large" diameters is used to mean diameters greater than 200 millimeters (mm) or indeed greater than 1 meter (m).

An application that requires "high performance sealing" is an application that presents:
  a low leakage rate (of the order of $10^8$ normal cubic centimeters per second and per millimeter of circumference ($Ncm^3/s/mm$));
  a high level of usable restitution (ability of the seal to follow any movement of its interfaces while remaining leaktight); and
  an ability to operate over a large temperature range (which may go from the cryogenic range, at around 20 kelvins (K), to high temperatures, higher than 1000 K).

OBJECT AND SUMMARY OF THE INVENTION

A main object of the present invention is thus to provide a low cost seal made by stamping and mitigating the drawbacks of the prior art.

This object is achieved by an annular metal static seal comprising a first annular bearing plate and a second annular bearing plate facing each other, the seal being characterized in that it further includes an annular central portion perpendicularly connecting together said first and second annular bearing plates and secured in sealed manner to each of them via a respective annular weld, the assembly thus presenting a section in the shape of the letter H on its side.

With this configuration, it is possible to obtain a seal in which the annular central portion that is distinct from the annular bearing plate is much more rigid and stronger, thereby making it possible to separate the "sealing" function from the "withstanding the end cap effect" function of the seal and avoiding any risk of excessive plastic deformation of the seal, as mentioned for the prior art.

Advantageously, each of said first and second annular bearing plates is of undulating shape, preferably comprising a recess between two bulges, at least one of which is for pressing against a facing surface where sealing is to be provided.

Advantageously, said annular central portion presents a U-shaped section that is widely open in a radially outward direction and said annular welds are made continuously over 360°, preferably without filler material, between inside surfaces of the first and second annular bearing plates on respective inside flanks of said recesses and an inside surface of said annular central portion substantially at positions close to its ends.

Preferably, said inside flanks of said recesses of said first and second annular bearing plates and said ends of said annular central portion have slopes that are substantially identical.

The invention also provides a method of fabricating such an annular metal static seal, the method comprising the following steps:
  making the annular central portion by forming a first metal sheet of predetermined thickness and welding its ends together so as to make a closed ring;
  making each of the first and second annular bearing plates by stamping a second metal sheet of predetermined thickness; and
  continuously welding said first and second annular bearing plates over 360° to said annular central portion.

Preferably, said step of continuously welding over 360° is performed without adding filler material between the inside surfaces of the first and second annular bearing plates on inside flanks of said recesses and an inside surface of said annular central portion at positions close to its ends.

Advantageously, said first and second metal sheets are of different thicknesses.

The invention finds an application in mechanical systems having straight flanges and in mechanical systems having ball joint connections.

BRIEF DESCRIPTION OF THE DRAWINGS

Other characteristics and advantages of the present invention appear from the following description made with reference to the accompanying drawings, which show an embodiment having no limiting character, and in which:

FIGS. 4 and 5 are axial half-section views showing mechanical systems incorporating FIG. 1; and FIG. 6 shows the various loads (pressure and reactions) acting on the FIG. 1 seal.

DETAILED DESCRIPTION OF AN EMBODIMENT

Figure 1:
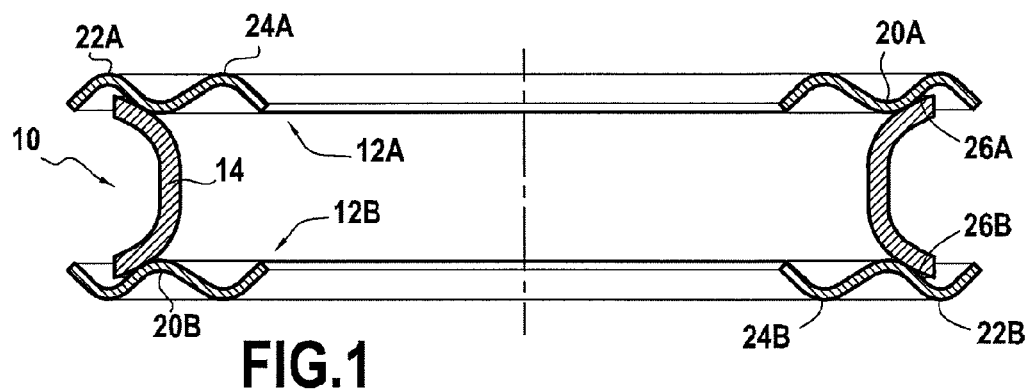
FIG. 1 is an axial section view of a metal static annular seal of the invention.
Figure 2:
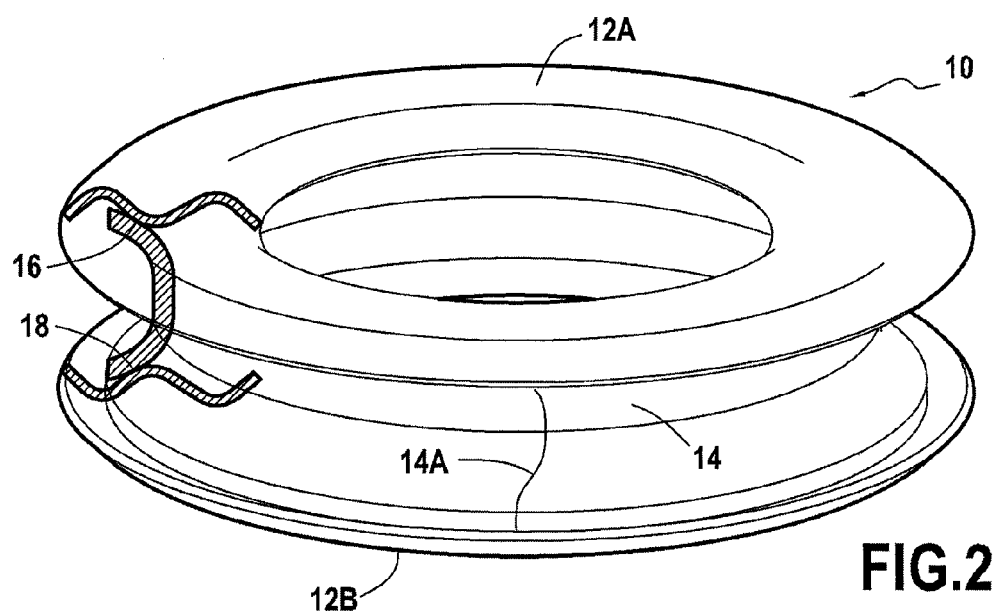
FIG. 2 is a perspective view of the FIG. 1 seal.

FIG. 1 is an axial section view of a metal static annular seal in accordance with the invention, which is also shown in perspective in FIG. 2. The seal 10 is made up of three distinct portions: a top undulating annular portion 12A that is substantially horizontal, and that forms a first bearing plate; a bottom undulating annular portion 12B that is substantially horizontal and that forms a second bearing plate facing the first portion; and an annular central portion 14 that is substantially vertical and that forms a resilient connecting wall between the first and second annular bearing plates.

The first and second annular bearing plates 12A and 12B are substantially identical and they are for pressing against the opposite surfaces (shown in FIGS. 5 and 6) of a mechanical system where sealing is to be provided. Each of them has a section of undulating shape with two preferred bearing zones or bulges 22A, 24A; 22B, 24B for coming into contact with the facing surface and spaced apart by a recess or setback zone 20A, 20B. The zones 24A and 24B are preferably for performing the sealing function. The zones 22A and 22B are not necessarily used for performing this sealing function, but they make it possible to control and limit the clamping force passing via the zones 24A and 24B.

The bearing plates are obtained in one or two operations by cutting and stamping a metal sheet previously obtained by rolling in order to have sufficient planeness. The thickness of this sheet is determined so as to impart sufficient stiffness to provide the looked-for sealing under a given clamping force, while guaranteeing the desired usable restitution.

The annular central portion 14 presents a U-shaped section that is wide open in an outward direction (also referred to as a cup-shaped section) and it is connected to the first and second annular bearing plates respectively by two welds 16, 18. The welds are made continuously over 360°, preferably without using filler material, over a possibly varying contact width between the inside surfaces of the first and second annular bearing plates on the inside flanks 26A, 26B of the recesses 20A, 20B and the inside surface of the annular central wall substantially close to its ends. This central portion is obtained by forming sheet metal and then welding together its ends by means of a weld 14A so as to give it a closed ring shape. The thickness of the sheet metal is determined so as to impart the expected performance to the seal, in particular performance in terms of crushing force and of ability to withstand pressure. In other words, the sheet metal 14 must be capable, without plastic deformation, of taking up the assembly clamping force and the end cap effect due to high pressures in operation.

It should be observed that the welds 16, 18, and 14A, which may for example be electric welds, do not involve particularly penalizing requirements since the three weld zones are separate from the zones that provide sealing. In addition, welding is made easier by the fact that the inside flanks of the recesses in the first and second annular bearing plates and the ends of the annular central wall present slopes that are substantially identical where the welds 16 and 18 are made.

The substrate of the seal is made of metal, for example it may be made of Inconel 718. However, the outside surfaces of the first and second annular bearing plates in contact with the surfaces where sealing is provided may be completely covered in a metallic or a non-metallic coating, e.g. having a thickness of several tens of micrometers. By way of example, the coating may be a coating of silver obtained by electroplating (for cryogenic applications, and up to medium temperatures of about 800 K), of softened nickel associated with a "flash" of silver (for applications at ambient temperature and up to very high temperatures of about 1200 K), or indeed of Teflon® or Microteflon® (for cryogenic applications, and up to moderate temperatures of about 500 K).

The operation of the seal is described in detail below with reference to FIG. 3, which shows the behavior of the seal firstly while it is being clamped in its housing (points O-A-B-C), and then when it is unloaded in operation (points C-D) as a result of possible enlargement of its housing due to the flexibility of the connections and to the severity of the applied loads (thermomechanical stresses). This figure plots the clamping force (F) as a function of the opening ($\delta$) of the housing for the seal, and it also serves to understand the concept of usable restitution.

The zone O-A in this figure corresponds to the seal being flattened while it is being clamped in its housing, and relates to the force needed for eliminating the natural warping (undulation) of the first and second annular bearing plates 12A, 12B (these undulations resulting from the combination of initial "warping" type deformation of the portions 12A, 12B, and 14, together with the deformation generated by the welds 14A, 16, and 18). The zone A-B-C corresponds to the crushing proper of the seal (i.e. the deformation of the portions 12A, 12B, and 14).

In operation, the housing can become enlarged and the clamping force on the seal can decrease, going from C towards D. So long as the clamping force in the zones 24A and 24B that are to provide sealing remains greater than the sealing limit ($F_{seal}$), sealing is ensured and the seal thus remains leaktight. The maximum enlargement of the housing that the seal can accommodate before it ceases to be leaktight (in other words until it begins to leak) is represented by Ru (i.e. its usable restitution).

Figure 3:
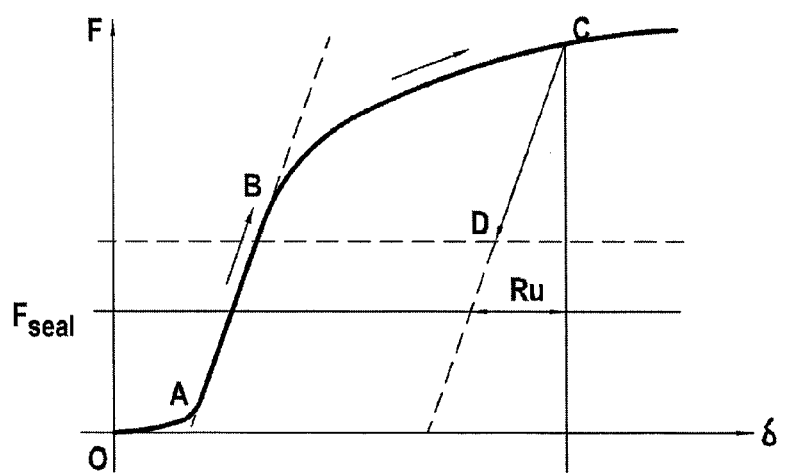
FIG. 3 shows the clamping behavior of the FIG. 1 seal.

It should be observed that the non-linear nature of the curve in FIG. 3 is representative of the seal suffering plastic deformation while being crushed. This plastic deformation applies to the bearing plates 12A and 12B only since, as mentioned above, the central portion 14 is voluntarily dimensioned so as to avoid plastic deformation, both during clamping of the seal during mounting and under the end cap effect due to the high pressures in operation.

Two implementations of a seal in accordance with the invention in a mechanical system are shown in FIGS. 4 and 5.

In the first situation shown in FIG. 4, a conventional flange connection is provided with sealing faces that are perpendicular to the axis of revolution of two pipe segments for connecting together and subjected to the pressure of a flowing fluid. The seal 100 is arranged in a housing 102 having one face formed by a groove 104 in a first pipe segment 106 that is terminated by a flange 108, and an opposite face that is formed by a groove 110 in a second pipe segment 112 and terminated by a flange 114. The flanges 108 and 114 are assembled together by fastener means such as bolts 116, for example. The seal is arranged in the housing in such a manner that the portions 12A and 12B are in contact with the grooves 104 and 110 but without coming into contact with the outer wall of the housing, which is generally terminated by a fillet.

FIG. 5 describes a ball joint type connection in which the seal 100 is incorporated in a housing 118 in which the sealing faces of the two segments 120 and 122 for connecting together are no longer perpendicular to the axis of revolution of the pipe, but are inclined relative to the axis.

FIG. 6 shows how loads due to the pressure P of the fluid passing through the seal 100 apply against the seal. This figure also shows the pressure-energizing effect of the seal. The more the pressure (P) of the fluid increases, the greater the clamping force (F) that is exerted by the first and second bearing plates against the housing 102 in which the seal is placed. The fact that the force exerted by the first bearing plate 12A against the housing for the seal is made up of two forces (F1 and F2) makes it possible to put a considerable limit on the plastic deformation of this first bearing plate when the utilization pressure of the seal becomes very large. This constitutes an important difference compared with prior art seals, in particular lip seals, where the lips suffer high levels of plastic deformation under high pressure, thereby correspondingly reducing the usable restitution of the seal. Finally, the radial thrust (Fr) exerted by the pressure on the seal is taken up almost entirely by the annular central portion 14 of the seal, which portion is made to be as rigid as necessary since it is made by forming a bearing plate of thickness that is greater than the thickness of the material constituting the first and second annular bearing plates.

It may be observed that the positioning of the welds 16 and 18 relative to the profile of the seal is such that both on mounting and also in operation these weld zones are situated in the bottoms of the recesses 20A, 20B created by the undulated shape of the profile of the seal in a zone that is compressed by the seal being clamped. This situation is favorable since the microcracks inherent to the presence of the welds are closed under such utilization conditions and are therefore not harmful in terms of risk of crack propagation.

Any residual deformation of the seal due to its welds may be considered as being acceptable, providing conventional precautions are taken during welding, such as appropriately holding the parts for bonding together during welding and making use of an effective system for removing the associated heat.

In the event of the first and second bearing plates of said seal being significantly deformed as a result of the welding operations, and in spite of the above-mentioned precautions, this deformation can be characterized by a long wavelength. Thus, the undulations in these bearing plates of the seal (warping effect) can easily be "erased" during the initial stage of clamping the seal in its housing (the stage O-A of flattening in FIG. 3).

It should also be observed that when the sealing function is provided solely by the zones 24A and 24B, it is appropriate to create deliberately a passage putting the outside of the seal into communication with the cavity trapped between the bearing face of the seal and the zones 22A and 24A (e.g. a hole through the bearing plate or a groove in the bearing face, with the same being applied on the other side). This makes it possible, by verifying sealing prior to operating in service, that it is indeed the zone 24A that is performing the intended sealing function properly, and not the zone 22A. This situation is of particular interest if the flanges are sufficiently flexible to move in operation. Under such circumstances, the housing of the seal will enlarge in operation and only the inside zone 24A and 24B will remain sealed, since the outside zones 22A and 22B will be subjected to a local force F2 that drops below the local sealing limit and possibly to zero, since they are situated at the ends of the stiffest portions of the elements 12A and 12B and since they are not subjected to the pressure (pressure-energizing effect) as are the portions 12A and 12B situated beside 24A and 24B. Nevertheless, if it is desirable for the seal to operate with two sealing zones on either side (22A, 22B and 24A, 24B respectively), in particular if the flanges are sufficiently rigid to avoid moving in operation, then the housing for the seal will not enlarge in operation and both zones for providing sealing will remain functional. That provides two sealing barriers, in other words double safety, which may potentially be of interest, e.g. in nuclear applications.

The invention claimed is:

1. An annular metal static seal, comprising:
a first annular bearing plate and a second annular bearing plate facing each other, the first annular bearing plate having a first uniform thickness and the second annular bearing plate having a second uniform thickness, wherein the first uniform thickness and the second uniform thickness are the same, the seal being characterized in that it further includes an annular central portion perpendicularly connecting together said first and second annular bearing plates and secured in sealed manner to each of them via a respective annular weld, the assembly thus presenting a section in the shape of the letter H on its side.

2. An annular metal static seal according to claim 1, characterized in that each of said first and second annular bearing plates is of undulating shape.

3. An annular metal static seal according to claim 2, characterized in that said undulating shape comprises a recess between two bulges, at least one of which is for pressing against a facing surface where sealing is to be provided.

4. An annular metal static seal according to claim 1, characterized in that said annular central portion presents a U-shaped section that is widely open in a radially outward direction.

5. An annular metal static seal according to claim 4, characterized in that each of said first and second annular bearing plates includes an undulating shape, and said undulating shape comprises a recess between two bulges, said annular welds are made continuously over 360°, preferably without filler material, between inside surfaces of the first and second annular bearing plates on respective inside flanks of said recesses and an inside surface of said annular central portion substantially at positions close to its ends.

6. An annular metal static seal according to claim 5, characterized in that said inside flanks of said recesses of said first and second annular bearing plates and said ends of said annular central portion have slopes that are substantially identical.

7. A method of fabricating an annular metal static seal according to claim 1, characterized in that it comprises the following steps:
making the annular central portion by forming a first metal sheet of predetermined thickness and welding its ends together so as to make a closed ring;
making each of the first and second annular bearing plates by stamping a second metal sheet of predetermined thickness; and
continuously welding said first and second annular bearing plates over 360° to said annular central portion.

8. A method according to claim 7, characterized in that each of said first and second annular bearing plates includes an undulating shape, and said undulating shape comprises a recess between two bulges, and said step of continuously welding over 360° is performed without adding filler material between inside surfaces of the first and second annular bearing plates on inside flanks of said recesses and an inside surface of said annular central portion at positions close to its ends.

9. A method according to claim 7, characterized in that said first and second metal sheets are of different thicknesses.

10. A mechanical system including an annular metal static seal according to claim 1.

11. An annular metal static seal, comprising:
a first annular bearing plate having an inner surface and an outer surface, and a second annular bearing plate having an inner surface and an outer surface, wherein the inner surfaces of the first and second annular bearing plates face each other, the seal being characterized in that it further includes an annular central portion perpendicularly connecting together said first and second annular bearing plates and secured in sealed manner to each of them via a respective annular weld, the assembly thus presenting a section in the shape of the letter H on its side, wherein the inner surface and the outer surface of said first and second annular bearing plates each have an undulating shape.

12. The annular metal static seal according to claim 11, wherein the first annular bearing plate has a first uniform thickness and the second annular bearing plate has a second uniform thickness, wherein the first uniform thickness and the second uniform thickness are the same.

* * * * *